United States Patent [19]

Ruddy

[11] Patent Number: 4,744,938
[45] Date of Patent: May 17, 1988

[54] METHOD AND APPARATUS FOR PRODUCING ULTRALOWMASS FISSIONABLE DEPOSITS FOR REACTOR NEUTRON DOSIMETRY BY RECOIL ION-IMPLANTATION

[75] Inventor: Francis H. Ruddy, Monroeville, Pa.

[73] Assignee: Westinghouse Electric Corp., Pittsburgh, Pa.

[21] Appl. No.: 897,466

[22] Filed: Aug. 18, 1986

[51] Int. Cl.$^4$ .............................................. G21C 17/00
[52] U.S. Cl. .................................... 376/153; 376/193; 376/200; 250/432 PD; 250/492.1
[58] Field of Search ............. 250/308, 432 PD, 472.1, 250/474.1, 492.1, 493.1, 496.1; 376/153, 193, 200, 154

[56] References Cited

U.S. PATENT DOCUMENTS

| | | | |
|---|---|---|---|
| 2,479,882 | 8/1949 | Wallhausen et al. | 250/493.1 |
| 2,975,113 | 3/1961 | Gordon | 250/493.1 |
| 3,000,697 | 9/1961 | Wahl | 250/493.1 |
| 3,123,511 | 3/1964 | Coleman | 156/272 |
| 3,239,667 | 3/1966 | Roberts, Jr. et al. | 250/83.1 |
| 3,280,329 | 10/1966 | Harmer et al. | 250/106 |
| 3,372,275 | 3/1968 | Kocher | 250/83.1 |
| 3,496,362 | 2/1970 | Kirkpatrick et al. | 250/106 |
| 3,516,939 | 6/1970 | Yokota et al. | 252/301.1 |
| 3,612,871 | 10/1971 | Crawford et al. | 250/83 |
| 3,915,757 | 10/1975 | Engel | 250/492.1 |
| 4,147,564 | 4/1979 | Magee et al. | 148/1.5 |
| 4,530,734 | 7/1985 | Klima | 156/628 |
| 4,613,758 | 9/1986 | Ing et al. | 250/474.1 |

FOREIGN PATENT DOCUMENTS 1061535  8/1964  United Kingdom .
1444719  8/1976  United Kingdom ............. 250/472.1

OTHER PUBLICATIONS

Int. J. Appl. Rad & Isotopes, (1971), vol. 22, pp. 289–299, Somogyi et al.
Health Physics, (1974), vol. 26, No. 1, pp. 102–104, Rago et al.
Neutron Dosimetry in High Intensity Fields: A Review, F. H. Ruddy, pp. 197–200, Pergamon Journals Ltd.
European Search Report.
Frank H. Ruddy et al., "Standardized Physics-Dosimetry for U.S. Pressure Vessel Cavity Surveillance Programs", *Fifth International ASTM-Euratom Symposium on Reactor Dosimetry*, Geesthacht, HEDL-SA-3095, Sep. 1984.

*Primary Examiner*—Salvatore Cangialosi
*Attorney, Agent, or Firm*—D. C. Abeles

[57] ABSTRACT

An alpha recoil ion-implantation method and apparatus are described which use an alpha-emitting source that is a radioactive parent of the daughter isotope of interest to implant into a suitable substrate the recoil daughter ions resulting from alpha decay of the parent. For example, a $^{241}$Am source in thin layer form is placed next to a substrate such as a solid state track recorder in a vacuum which houses an assembly for rotating opposing disks receiving the alpha-emitting source and the substrate, respectively. Each alpha decay of $^{241}$Am results in a $^{237}$Np ion with enough recoil energy to be implanted into the substrate. Fissionable deposits of $^{239}$Pu, $^{235}$U, and $^{238}$U can also be made by this method and apparatus.

21 Claims, 1 Drawing Sheet

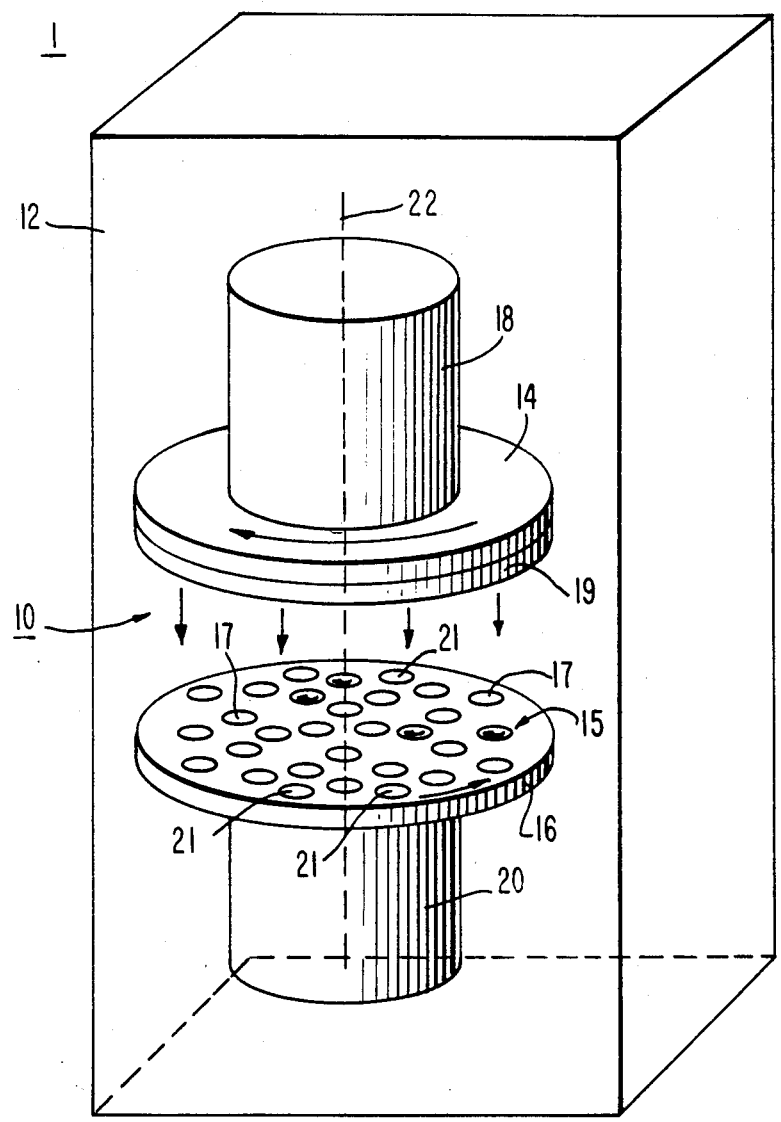

METHOD AND APPARATUS FOR PRODUCING ULTRALOWMASS FISSIONABLE DEPOSITS FOR REACTOR NEUTRON DOSIMETRY BY RECOIL ION-IMPLANTATION

BACKGROUND OF THE INVENTION

This invention relates to a method and apparatus for producing fissionable deposits and, more particularly, to a method for producing fissionable deposits of ultralow-mass for reactor neutron dosimetry on a substrate by recoil ion-implantation, and an apparatus related thereto.

Ultralow-mass fissionable deposits have proved useful as fissioning sources for solid state track recorder fission rate measurements in high intensity neutron fields. These fission rate measurements are used to derive information for neutron dosimetry purposes.

A solid state track recorder placed adjacent to a thin fissionable deposit records tracks from the recoiling fission fragments which result from the fission in the deposit. If the fissionable deposit is sufficiently thin, the effects of self-absorption can be ignored. The number of these tracks observed with an optical microscope after chemical etching of the solid state track recorder is proportional to the number of fissions that has occurred in the fissionable deposit. Thus, the number of fission fragment tracks per square centimeter, i.e., the track density, in the solid state track recorder can be used to calculate the fission rate per unit area in the fissionable deposit.

For typical high neutron fluence applications, such as reactor core dosimetry or reactor component dosimetry, it has been found that a limitation is placed on using solid state track recorders due to the maximum track density that can be used without excessive track overlap, usually about $10^6$ tracks/cm$^2$. In order to avoid excessively high track densities, low-mass fissionable deposits can be used to reduce the number of fissions that will occur at a given neutron fluence.

For example, in dosimetry applications for light water reactor pressure vessel surveillance, $^{235}$U deposits with masses as low as $1.5 \times 10^{-13}$ grams are required to produce a usable solid state track recorder track density. Similarly, low masses of other isotopes, such as $^{237}$Np, $^{238}$U, $^{239}$Pu, are required for dosimetry in light water reactor pressure vessel surveillance.

It has been found that the technical problems associated with the manufacture of such low-mass deposits can be overcome through the use of isotopic spiking-/electroplating techniques to characterize the masses of these ultralow-mass fissionable deposits. For example, ultralow-mass deposits can be produced by an electroplating technique using, e.g., $^{237}$U (7 day half-life) as an isotopic spike for $^{235}$U and $^{238}$U, $^{239}$Np (2.4 day half-life) as a spike for $^{237}$Np, and $^{236}$Pu (2.85y half-life) as a spike for $^{239}$Pu. The shorter half-life isotopic spike is used as a chemical tracer to overcome the fact that the radioactivity of the principal isotope of the respective fissionable deposit renders the principal isotope undetectable when present in such low masses as can be employed according to the present invention.

However, it has also been found that the amount of the isotopic spike that can be added to a fissionable deposit is limited by the nuclear properties of the isotopic spike. For example, $^{237}$U decays to $^{237}$Np, which is itself fissionable. As a result, the amount of the isotope to which the spike eventually decays must be kept small enough (by limiting the amount of spike added) to keep the fission rate of the isotope to which the spike decays small relative to the decay rate of the isotope of interest in the deposit. Also, in order to ensure that the added $^{237}$U is a valid radiochemical tracer for $^{235}$U, a series of chemical steps or chemical equilibration procedures must be carried out. After the addition of $^{237}$U to $^{235}$U, the mixture must be subjected to an alternating series of chemical oxidations and reductions to drive the $^{237}$U and $^{235}$U into an identical mixture of oxidation states. These chemical procedures typically take 1–2 days.

In particular regard to $^{239}$Pu deposits, the $^{236}$Pu isotopic spike itself is fissionable and must therefore be used in limited amounts. In addition, for $^{239}$U deposits spiked with $^{236}$Pu, several experimental problems arise. For example, in the case of $^{239}$Pu fission rates in a solid state track recorder measured at the mid-plane location in the reactor cavity in the annular gap of an operating commercial power reactor during a typical operating cycle, $^{239}$Pu fissionable deposits with masses on the order of $10^{-13}$ gram are required to produce an optimum number of fission tracks. Namely, due to the previously explained limitations, the maximum allowable $^{236}$Pu/$^{239}$Pu spike ratio results in a count rate of only about 0.3 disintegrations per minute (dpm) for such a $^{239}$Pu deposit of $10^{-13}$ gram.

In order to desirably characterize the decay rate of this deposit to better than 2% for mass calibration purposes, a counting time of about twelve days may be required. In practice, higher masses (e.g., $6 \times 10^{-13}$ gram) are produced resulting in higher count rates (e.g., 1 dpm) and shorter count times (e.g., 2 days). The resulting track densities are higher and are more difficult to count. Also, due to the low sample count rate, counters with very low background count rates of about 0.1 dpm must be used. However, the decay properties of the isotopic spike make maintenance of the low backgrounds difficult. For example, $^{236}$Pu decays as follows:

$$^{236}\text{Pu} \xrightarrow[285y]{\alpha} {}^{232}\text{U} \xrightarrow[72y]{\alpha} {}^{228}\text{Th} \xrightarrow[1.9y]{\alpha} {}^{224}\text{Ra} \xrightarrow[3.6 \text{ days}]{\alpha}$$

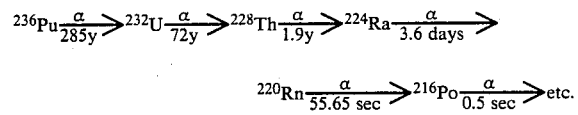

$$^{220}\text{Rn} \xrightarrow[55.65 \text{ sec}]{\alpha} {}^{216}\text{Po} \xrightarrow[0.5 \text{ sec}]{\alpha} \text{etc.}$$

Thus, many radioactive decay products accumulate from the decay of $^{236}$Pu, and these decay products must be periodically removed from the counters by cleaning to maintain low counter backgrounds.

In light of the above, a simpler and more reliable method is needed for producing fissionable deposits of ultralow-mass for nuclear reactor dosimetry.

SUMMARY OF THE INVENTION

Accordingly, it is an object of the present invention to provide a method and apparatus for producing ultralow-mass fissionable deposits for reactor neutron dosimetry by recoil ion-implantation capable of eliminating the need for isotopic spiking procedures.

It is another object of the present invention to provide a method and apparatus for producing ultralow-mass fissionable deposits for reactor neutron dosimetry by recoil ion-implantation capable of eliminating the need for electroplating techniques and the related high purity chemical requirements.

It is another object of the present invention to provide a method and apparatus for producing ultralow-mass fissionable deposits for reactor neutron dosimetry by recoil ion-implantation capable of producing highly uniform deposits previously unavailable through electroplating methods.

It is another object of the present invention to provide a method and apparatus for producing ultralow-mass fissionable deposits for reactor neutron dosimetry by recoil ion-implantation wherein only the apparatus need be calibrated.

It is another object of the present invention to provide a method and apparatus for producing ultralow-mass fissionable deposits for reactor neutron dosimetry by recoil ion-implantation capable of using a variety of substrates for ion implantation.

It is another object of the present invention to provide a method and apparatus for producing ultralow-mass fissionable deposits for reactor neutron dosimetry by recoil ion-implantation, wherein the masses of the fissionable deposits produced can be controlled precisely.

It is another object of the present invention to provide a method and apparatus for producing ultralow-mass fissionable deposits for reactor neutron dosimetry by recoil ion-implantation, wherein the resulting material in the fissionable deposit is isotopically pure.

Finally, it is an object of the present invention to provide a method and apparatus for producing ultra-low-mass fissionable deposits for reactor neutron dosimetry by recoil ion-implantation capable of producing fissionable deposits of extremely low masses on solid state track recorders.

To achieve the foregoing and other objects of the present invention, and in accordance with the purposes of the invention, there is provided an alpha recoil ion-implantation method and related apparatus which use an alpha emitting source that is a radioactive parent of the daughter isotope of interest to implant into a substrate the recoil ions of the daughter resulting from the alpha decay. For example, a $^{241}$Am source in thin layer form can be placed next to a substrate such as a solid state track recorder in a vacuum which houses an assembly for rotating opposing disks receiving the alpha emitting source and the solid state track recorder, respectively. Each alpha decay of $^{241}$Am results in a $^{237}$Np ion with enough recoil energy to be implanted into the solid state track recorder. Fissionable deposits of $^{239}$Pu, $^{235}$U, and $^{238}$U can also be made by using this method and apparatus. Fissionable deposits with masses appropriate for high neutron fluence dosimetry are thusly prepared.

BRIEF DESCRIPTION OF THE DRAWING

The accompanying drawing, which is incorporated in and constitutes a part of the specification, illustrates an embodiment of the invention, and together with the description, serves to explain the principles of the invention.

FIG. 1 is a schematic view of the apparatus according to the present invention for producing ultralow-mass fissionable deposits by recoil ion-implantation.

DETAILED DESCRIPTION OF THE PREFERRED EMBODIMENTS

The preferred embodiments according to the present invention will now be described.

The method for producing $^{235}$U and the apparatus used therewith are described first. $^{235}$U is produced by the decay of $^{239}$Pu according to the following Equation (1):

(1)

The alpha ($\alpha$) particles emitted by $^{239}$Pu have an energy of 5.16 MeV. Conservation of momentum dictates that:

$$(\alpha\text{Energy})(\alpha\text{Mass}) = (\text{Recoil Energy})(\text{Recoil Mass}) \quad (2).$$

Using Equation (2):

$$\begin{aligned}
\text{Recoil Energy} &= (4/235)(5.16 \text{ MeV}) & (3) \\
&= 8.78 \times 10^{-2} \text{ MeV} & (4) \\
&= 87.8 \text{ keV} & (5)
\end{aligned}$$

As a result, each $^{239}$Pu decay yields a 5.16 MeV alpha particle accompanied by an 87.8 keV $^{235}$U recoil.

If a thin deposit of $^{239}$Pu is placed in a vacuum, about 50% of the alpha decays thereof will result in a $^{235}$U ion being recoiled into the vacuum. If a suitable substrate is placed in the vacuum adjacent to the $^{239}$Pu source, the recoil $^{235}$U ions will be implanted in the surface of the substrate, resulting in an ultralow-mass deposit of $^{235}$U.

The present invention is best suited for alpha recoil ion implantation because beta or gamma emissions lack sufficient momentum for the respective daughter to be implanted in the substrate.

By using an extrapolation of the well-known range-energy tables found in "Range and Stopping Power Tables for Heavy Ions," L. C. Northcliffe and R. F. Schilling, Nuclear Data Tables, A-7, 233-463 (1970), the recoil range of 87.8 keV $^{235}$U ions is estimated to be about 10 $\mu$g/cm$^2$. Thus, a 10 $\mu$g/cm$^2$ layer of $^{239}$Pu would retain about 50% of its recoils, so that an effective maximum thickness of a $^{239}$Pu layer can be about 5 $\mu$g/cm$^2$. For a 10 cm diameter layer of $^{239}$Pu of a thickness greater than the range of the $^{235}$U recoils, the number of $^{235}$U recoils that would escape from the $^{239}$Pu layer is calculated as understood in the art to be:

$$\frac{\pi(5 \text{ cm}^2)(5 \times 10^{-6} \text{ g/cm}^2)(6.022 \times 10^{23} \text{ atoms/mole})}{(235 \text{ g/mole})} \times$$

$$\frac{(0.693)}{(2.411 \times 10^4)(365.23)(24)(3600)} \text{ (sec}^{-1})$$

$$= 9.17 \times 10^5 \text{ ions/sec} \quad (6)$$

$$= 7.92 \times 10^{10} \text{ ions/day} \quad (7)$$

For a substrate at a distance of 5 cm from this $^{239}$Pu source, roughly $2.5 \times 10^8$ $^{235}$U ions/cm$^2$/day of $^{235}$U would be implanted.

The $^{235}$U mass requirement for a mid-plane reactor cavity solid state track recorder neutron dosimeter is for instance $1.5 \times 10^{-13}$ grams. This deposit is typically spread over an area with a diameter of $\frac{1}{4}$ in. The resulting atomic density of the deposit is $1.21 \times 10^9$ atoms/cm$^2$ of $^{235}$U. The time required to produce a deposit with this thickness is:

$$\frac{1.21 \times 10^9 \text{ atoms/cm}^2}{2.5 \times 10^8 \text{ ions/cm}^2/\text{day}} = 4.8 \text{ days} \qquad (8)$$

Solid state track recorder neutron dosimeters typically have an overall diameter of 1.1 cm. As a result, about 25-50 solid state track recorders could be simultaneously irradiated adjacent to a 10 cm diameter $^{235}$Pu source. An apparatus such as that shown in FIG. 1 and referred to generally by reference numeral 1, which will now be described, is used.

The apparatus 1 includes an assembly 10 enclosed in a vacuum chamber 12. The assembly 10 has a disk 14 opposing a disk 16, with a separation of about 5 cm therebetween. The disk 14 and the disk 16 are each about 10 cm in diameter. Preferably, high purity nickel is used as the material of the disk 14. Any other high purity metal, such as stainless steel, can be substituted as long as good adherence characteristics exist between the radioactive parent described below and the material of the disk 14. The bottom surface of the disk 14 is plated with a layer 19 of 10 $\mu$g/cm$^2$ of $^{239}$Pu which is the radioactive parent source. The disk 16 includes thereon facing the layer 19, at least one substrate 15, for example, a plurality of mica, quartz or zircon solid state track recorder wafers 17, each about 1.1 cm in diameter, for receiving a fissionable daughter 21 deposited by recoil ion-implantation. The disk 14 is rotated about an axis 22 through the center of each disk 14 and 16 via, e.g., a motor 18, to ensure deposit uniformity. Each of the wafers 17 is also rotated about its respective axis relative to the disk 16. This results in a uniform deposit on each wafer 17, and a calibration function for the apparatus wherein the amount of respective uniform deposit on each wafer can depend on the radial position of each wafer from the axis of rotation of the disk 14. This rotation can be accomplished, e.g., by using a set of gears at each individual wafer 17 which is operatively connected to a motor to form a drive means 20. Disk 16 may also be rotated by the drive means 20. Generally, there should be at least two independent rotations, preferably of the source layer 19 and each wafer 17.

It is preferable that the plurality of wafers 17 be loaded in a clean (laminar flow) area prior to rapid insertion into the vacuum chamber 12 which would be located in a glovebox. A glovebox is a container conventionally used to isolate from the environment radioactivity from a source in the glove box.

When put into practice, this new method is simpler and more economical than previous methods. In addition, some of the fissionable deposits formed according to the present invention can be very durable, such that they are able to withstand scrubbing to clean the substrate.

About 25 deposits can be made in 5 days, and deposit calibration requirements diminish as the assembly 10 is calibrated. That is, a set of trial experiments can be performed to measure how many ions hit a wafer 17 as a function of time. For example, where a $^{243}$Am source is used to make $^{239}$Np recoils which would decay to plutonium, as described below, the assembly 10 is run under a carefully controlled set of conditions. Then it is determined radiometrically how much $^{239}$Np is present on the wafer 17. This calibration can then be used to produce other wafers 17, without requiring further re-calibration. That is, if a certain recoil thickness is made on a wafer 17 in 10 minutes, a corresponding doubled recoil thickness would be expected when the irradiation is allowed to occur for 20 minutes.

Furthermore, the production of uniform $^{235}$U, $^{237}$Np, $^{238}$U, $^{239}$Pu deposits as described herein simplifies the track counting enormously. This is because quantitative track counting over the entire surface of non-uniform deposits is required. With this new method, only sampling of the uniform track density is required.

An alternate embodiment directed to producing $^{237}$Np will now be described.

$^{237}$Np is produced by the decay of $^{241}$Am as follows:

$$\qquad\qquad\qquad\qquad\qquad\qquad (9)$$

The alpha particles emitted by $^{241}$Am have an energy of 5.49 MeV. Using Equation (2):

| Recoil Energy | = (4/237)(5.49 MeV) | (10) |
|---|---|---|
| | = 9.27 × 10$^{-2}$ MeV | (11) |
| | = 92.7 keV | (12) |

As a result, each $^{241}$Am decay yields a 5.49 MeV alpha particle accompanied by a 92.7 keV $^{237}$Np recoil. If a thin deposit of $^{241}$Am as determined according to the preceding example is placed in a vacuum, a corresponding amount of the decays will result in a $^{237}$Np recoil into the vacuum. If a substrate is placed in the vacuum adjacent to the $^{241}$Am source as described above, recoil $^{237}$Np ions will be implanted in the surface of the substrate to provide an ultralow-mass deposit of $^{237}$Np.

By again using an extrapolation of the abovecited range-energy tables of Northcliffe and Schilling, the recoil range of 92.7 keV $^{237}$Np ions is estimated to be about 10 $\mu$g/cm$^2$. Thus, a 10 $\mu$g/cm$^2$ layer of $^{241}$Am would retain about 50% of its recoils, or, stated otherwise, the effective maximum thickness of an $^{241}$Am layer is about 5 $\mu$g/cm$^2$. For a 10 cm diameter layer of $^{241}$Am of thickness greater than the range of the $^{237}$Np recoils, the number of $^{237}$Np recoils that would escape from the $^{241}$Am layer is calculated as above to be:

$$\frac{\pi(5 \text{ cm}^2)(5 \times 10^{-6} \text{ g/cm}^2)(6.022 \times 10^{23} \text{ atoms/mole})}{(241 \text{ g/mole})} \times$$

$$\frac{(0.693)}{(458)(365.25)(24)(3600)} \text{ (sec}^{-1})$$

$$= 4.71 \times 10^7 \text{ ions/sec} \qquad (13)$$

$$= 4.07 \times 10^{12} \text{ ions/day} \qquad (14)$$

For a substrate at a distance of 5 cm from this $^{241}$Am source, roughly 1.3×10$^{10}$ $^{237}$Np ions/cm$^2$/day would be implanted.

The $^{237}$Np mass requirement for a mid-plane reactor cavity solid state track recorder neutron dosimeter is for instance 6.3×10$^{-11}$ gram. This deposit is typically spread over an area with a diameter of ¼ in. The resulting atomic density of the $^{237}$Np deposit is 5.05×10$^{11}$ atoms/cm$^2$. The time required to produce a deposit with this thickness is:

$$\frac{5.05 \times 10^{11} \text{ atoms/cm}^2}{1.3 \times 10^{10} \text{ ions/cm}^2/\text{day}} = 39 \text{ days} \quad (15)$$

As stated above, solid state track recorder neutron dosimeters typically have an overall diameter of 1.1 cm. About 25-50 solid state track recorders can be simultaneously irradiated adjacent to a 10 cm diameter $^{241}$Am source. An arrangement such as that shown in FIG. 1 and described above could be used.

An alternate embodiment directed to producing $^{238}$U will now be described.

$^{238}$U is produced by the decay of $^{242}$Pu as follows:

$$^{242}\text{Pu} \xrightarrow[3.763 \times 10^5 \text{y}]{\alpha} {}^{238}\text{U} \quad (16)$$

The alpha particles emitted by $^{242}$Pu have an energy of 4.90 MeV. Using Equation (2):

Recoil Energy = (4/242)(4.90 MeV)  (17)

= $8.10 \times 10^{-2}$ MeV  (18)

= 81.0 keV  (19)

As a result, each $^{242}$Pu decay yields a 4.90 MeV alpha particle accompanied by an 81.0 keV $^{238}$U recoil. If a thin deposit of $^{242}$Pu is placed in a vacuum, about 50% of the decays will result in a $^{238}$U recoil into the vacuum. If a substrate is placed in the vacuum adjacent to the $^{242}$Pu source as described above, recoil $^{238}$U ions will be implanted in the surface of the substrate, resulting in an ultralow-mass deposit of $^{238}$U.

By again using an extrapolation of the above-cited range-energy tables of Northcliffe and Schilling, the recoil range of 81.0 keV $^{238}$U ions is estimated to be about 10 µg/cm². Thus, a 10 µg/cm² layer of $^{242}$Pu would retain about 50% of its recoils so that an effective maximum thickness of a $^{242}$Pu layer would be about 5 µg/cm². For a 10 cm diameter layer of $^{242}$Pu with a thickness greater than the range of $^{238}$U recoils, the number of $^{238}$U recoils that would escape from the $^{242}$Pu layer is:

$$\frac{\pi(5 \text{ cm}^2)(5 \times 10^{-6} \text{ g/cm}^2)(6.022 \times 10^{23} \text{ atoms/mole})}{(242 \text{ g/mole})} \times$$

$$\frac{(0.693)}{(3.763 \times 10^5)(365.23)(24)(3600)} (\text{sec}^{-1})$$

= $5.70 \times 10^4$ ions/sec  (20)

= $4.93 \times 10^9$ ions/day  (21)

For a substrate at a distance of 5 cm from this $^{242}$Pu source, roughly $1.6 \times 10^7$ $^{238}$U ions/cm²/day would be implanted.

The $^{238}$U mass requirement for a mid-plane reactor cavity solid state track recorder neutron dosimeter is $7.0 \times 10^{-10}$ gram. This deposit is typically spread over an area with a diameter of ¼ in. The resulting atomic density of the deposit is $5.59 \times 10^{12}$ atoms/cm² of $^{235}$U. The time required to produce a deposit with this thickness is:

$$\frac{5.59 \times 10^{12} \text{ atoms/cm}^2}{1.6 \times 10^7 \text{ ions/cm}^2/\text{day}} = 3.56 \times 10^5 \text{ days} \quad (22)$$

Although such a time requirement is larger than practical for production of reactor cavity dosimeters, the production of dosimeters for higher fluence application where the flux is a factor of $10^3$ to $10^5$ higher than in the reactor cavity is clearly feasible.

As stated above, solid state track recorder neutron dosimeters typically have an overall diameter of 1.1 cm. About 25-50 solid state track recorders can be simultaneously irradiated adjacent to a 10 cm diameter $^{242}$Pu source. An arrangement such as shown in FIG. 1 and described above can be used.

A still further embodiment directed to producing $^{239}$Pu will now be described.

$^{239}$Pu is produced by the decay of $^{243}$Am as follows:

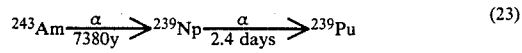
$$^{243}\text{Am} \xrightarrow[7380\text{y}]{\alpha} {}^{239}\text{Np} \xrightarrow[2.4 \text{ days}]{\alpha} {}^{239}\text{Pu} \quad (23)$$

The alpha particles emitted by $^{243}$Am have an energy of 5.28 MeV. Again, using Equation (2):

Recoil Energy = (4/239)(5.28 MeV)  (24)

= $8.84 \times 10^{-2}$ MeV  (25)

= 88.4 keV  (26)

As a result, each $^{243}$Am decay yields a 5.28 MeV alpha particle accompanied by an 88.4 keV $^{239}$Np recoil. If a thin deposit of $^{243}$Am is placed in a vacuum, a corresponding amount of the decays will result in a $^{239}$Np recoil into the vacuum. If a substrate is placed in the vacuum adjacent to the $^{243}$Am source as described above, recoil $^{239}$Np ions will be implanted in the surface of the substrate. These $^{239}$Np atoms will, over a period of weeks, all decay to $^{239}$Pu, resulting in an ultralow-mass deposit of $^{239}$Pu.

By again using an extrapolation of the above-cited range-energy tables of Northcliffe and Schilling, the recoil range of 88.4 keV $^{239}$Np ions is estimated to be about 10 µg/cm². Thus, a 10 µg/cm² layer of $^{243}$Am would retain about 50% of its recoils, so that an effective maximum thickness of a $^{243}$Am layer can be about 5 µg/cm². For a 10 cm diameter layer of $^{243}$Am of a thickness greater than the range of the $^{239}$Np recoils, the number of $^{239}$Np recoils that would escape from the $^{243}$Am layer is given by:

$$\frac{\pi(5 \text{ cm}^2)(5 \times 10^{-6} \text{ g/cm}^2)(6.022 \times 10^{23} \text{ atoms/mole})}{(243 \text{ g/mole})} \times \quad (27)$$

$$\frac{(0.693)}{(7380)(365.25)(24)(3600)} (\text{sec}^{-1}) =$$

$2.90 \times 10^6$ ions/sec

For a substrate at a distance of 5 cm from this source, roughly $9.2 \times 10^3$ ions/cm²/day of $^{239}$Np would be implanted.

Assume for instance that the mass requirement for a $^{239}$Pu mid-plane reactor cavity solid state track recorder neutron dosimeter is $8.9 \times 10^{-14}$ grams. This deposit is typically spread over an area with a diameter of ¼ in. The resulting atomic density of the deposit is $7.08 \times 10^8$ atoms/cm$^2$ of $^{239}$Pu. The time required to produce a deposit with this thickness is:

$$\frac{7.08 \times 10^8 \text{ atoms/cm}^2}{9.2 \times 10^3 \text{ ions/cm}^2/\text{sec}} = 77.0 \times 10^4 \text{ sec}$$

$$= 21.3 \text{ hours}$$

As discussed above, solid state track recorder neutron dosimeters typically have an overall diameter of 1.1 cm. About 25–50 solid state track recorders could be simultaneously irradiated adjacent to a $^{243}$Am source of 10 cm diameter. An arrangement such as that shown in FIG. 1 could be used.

After deposition, a deposit of $^{239}$Np of for instance $8.9 \times 10^{-14}$ gram has a beta or gamma activity of $4.59 \times 10^4$ dpm, which allows easy mass calibration as it decays to $^{239}$Pu.

Further, this method makes possible the prospect of applying solid state track recorder neutron dosimetry to higher neutron fluence measurements. An application of immediate relevance is the use of solid state track recorder neutron dosimeters in the pressure vessel surveillance capsules of operating commercial nuclear power reactors. Previous attempts at solid state track recorder neutron dosimetry in this location have not been fruitful because of formidable problems with high track densities resulting from inherent mass limitations in the electroplating methods used to produce fissionable deposits, dosimeter size limitations, and deposit uniformity. It is believed these problems can be overcome with the new method and apparatus described herein for producing for instance $^{235}$U, $^{237}$Np, $^{238}$U, and $^{239}$Pu fissionable deposits.

In light of the above, the present invention has the following advantages over the previously known methods:

(1) isotopic spiking methods are not needed;
(2) electroplating methods and the resulting high purity chemical requirements are not needed;
(3) uniform deposits can be made, whereas high deposit uniformity has not been achieved with electroplating methods;
(4) only the apparatus need be calibrated, and, after calibration, the time of exposure will be proportional to deposit mass at a given substrate location;
(5) a variety of substrates may be used;
(6) the masses of the $^{235}$U, $^{237}$Np, $^{238}$U, $^{239}$Pu deposits can be controlled precisely;
(7) the resulting material in the $^{235}$U, $^{237}$Np, $^{238}$U, $^{239}$Pu deposit is isotopically pure;
(8) extremely low masses are possible;
(9) deposits formed by ion implantation are durable;
(10) the present invention is simpler and more economical than previous methods; and
(11) the present invention simplifies track counting significantly.

The foregoing is considered illustrative only of the principles of the invention. Further, since numerous modifications and changes will readily occur to those skilled in the art, it is not desired to limit the invention to the exact construction and operation shown and described. Accordingly, resort may be had to all suitable modifications and equivalents falling within the scope of the invention and the appended claims.

What is claimed is:

1. A method for producing a fissionable deposit of selectively ultralow mass for neutron dosimetry, comprising the steps of:
    (a) spacing in opposing relation a substrate and an alpha-emitting parent source which decays to implant into the substrate a fissionable daughter ejected from the parent source as a result of the decay; and
    (b) holding the opposing relation for a period of time until the parent source decays to form a corresponding mass of isotopically pure fissionable daughter uniformly on the substrate.

2. The method as recited in claim 1, wherein step (a) further comprises the substep of locating the parent source and the substrate on respective, opposing holding means, and
    wherein step (b) comprises the substep of rotating the respective, opposing holding means relative to each other to promote uniformity of the implantation of the fissionable daughter on the substrate.

3. The method as recited in claim 1, wherein step (a) further comprises the substep of:
    selecting the parent source from the group consisting of $^{239}$Pu, $^{241}$Am, $^{242}$Pu and $^{243}$Am.

4. The method as recited in claim 1, wherein step (a) further comprises the substep of:
    selecting the parent source so that the fissionable daughter is $^{239}$Pu.

5. The method as recited in claim 1, wherein step (a) further comprises the substep of:
    selecting the parent source so that the fissionable daughter is $^{235}$U.

6. The method as recited in claim 1, wherein step (a) further comprises the substep of:
    selecting the parent source so that the fissionable daughter is $^{237}$Np.

7. The method as recited in claim 1, wherein step (a) further comprises the substep of:
    selecting the parent source so that the fissionable daughter is $^{238}$U.

8. The method as recited in claim 2, wherein step (a) further comprises the substep of locating a plurality of substrates on the respective holding means, and
    wherein step (b) further comprises the substep of individually rotating each of the plurality of substrates while at least one of the holding means is rotated with respect to the other holding means.

9. The method as recited in claim 8, wherein each of the plurality of substrates is provided in the form of a wafer.

10. The method as recited in claim 8, wherein the respective holding means for the parent source is a disk having its axis aligned with an axis of relative rotation of the other holding means, and the parent source is provided in the form of a layer on the disk.

11. The method as recited in claim 1, further comprising the steps of:
    performing a calibration by measuring the amount of the fissionable daughter implanted on the substrate during the period of time of the holding of step (b); and
    subsequently implanting a predetermined amount of the fissionable daughter in a further substrate by repeating the steps (a) and (b) with the further substrate,
    wherein the period of time is selected to form the predetermined amount of the fissionable daughter on the further substrate.

12. An apparatus for producing a fissionable deposit of selectively ultralow mass for neutron dosimetry, comprising:
 (a) first means for receiving an alpha-emitting parent source; and
 (b) second means for receiving a substrate,
 wherein the parent source and the substrate are held in an opposing, spaced relation so that a fissionable daughter that is ejected from the parent source is implanted isotopically pure and uniformly into the substrate.

13. The apparatus as recited in claim 12, further comprising:
 (c) a plurality of substrates held by the second means; and
 (d) rotation means for rotating the first and second means relative to each other for uniformly implanting the fissionable daughter in each of the plurality of substrates.

14. The apparatus as recited in claim 13, wherein each of the plurality of substrates is a solid state track recorder.

15. The apparatus as recited in claim 14, wherein each solid state track recorder is a wafer selected from the group consisting of mica, quartz and zircon.

16. The apparatus recited in claim 12, wherein the first means is of nickel, and the parent source is in the form of a layer formed thereon.

17. The apparatus as recited in claim 13, wherein the rotation means includes means for individually rotating each of the plurality of substrates on said second means while rotating at least one of said first and second means relative to the other.

18. An implanted substrate prepared by the process of claim 1, having a predetermined amount of the fissionable daughter implanted therein as a result of specifying the period of time of the holding step (b).

19. An implanted substrate prepared by the process of claim 2, having a predetermined amount of the fissionable daughter implanted therein as a result of specifying the period of time of the holding step (b).

20. An implanted substrate prepared by the process of claim 8, having a predetermined amount of the fissionable daughter implanted therein as a result of specifying the period of time of the holding step (b).

21. The apparatus of claim 17, wherein the apparatus is capable of calibration as a function of the radial position of the substrate from the axis of relative rotation of said first and second means.

* * * * *